(12) United States Patent
Höninger et al.

(10) Patent No.: US 12,710,407 B2
(45) Date of Patent: Aug. 18, 2026

(54) MANAGING A HEAT TRANSFER CHARACTERISTIC IN A TEMPERATURE CONTROL CHAMBER

(71) Applicant: Agilent Technologies, Inc., Santa Clara, CA (US)

(72) Inventors: Lena Höninger, Karlsruhe (DE); Uwe Effelsberg, Karlsruhe (DE)

(73) Assignee: Agilent Technologies, Inc., Santa Clara, CA (US)

( * ) Notice: Subject to any disclaimer, the term of this patent is extended or adjusted under 35 U.S.C. 154(b) by 447 days.

(21) Appl. No.: 17/866,009

(22) Filed: Jul. 15, 2022

(65) Prior Publication Data

US 2023/0015064 A1 Jan. 19, 2023

(51) Int. Cl.
*G01N 30/88* (2006.01)
*G01N 30/30* (2006.01)

(52) U.S. Cl.
CPC ............. *G01N 30/88* (2013.01); *G01N 30/30* (2013.01); *G01N 2030/3084* (2013.01); *G01N 2030/889* (2013.01)

(58) Field of Classification Search
CPC .............................................. G01N 2030/3069
See application file for complete search history.

(56) References Cited

U.S. PATENT DOCUMENTS 3,920,365 A * 11/1975 Mules ..................... B29C 48/08 425/141
4,420,679 A 12/1983 Howe
4,752,216 A 6/1988 Hurrell
6,386,050 B1 * 5/2002 Yin ....................... G01F 1/7086 73/204.14
2001/0000403 A1 * 4/2001 Gaisford .................. H05B 6/80 219/679
2005/0066747 A1 * 3/2005 Sobek ................... G01F 1/7084 73/861.95
2012/0285325 A1 11/2012 Tipler et al.
2014/0047900 A1 2/2014 Amirav et al.

FOREIGN PATENT DOCUMENTS

EP 0876607 A1 11/1998
GB 1277207 A 6/1972
JP 2009007939 * 1/2009
JP 2011510298 * 3/2011
JP 2015034702 A 2/2015
JP 2015184103 A 10/2015

OTHER PUBLICATIONS

UK IPO Combined Search and Examination Report under Sections 17 and 18(3) dated May 29, 2024 for Application No. GB2319105.9.5; 6 pages.
UK IPO Combined Search and Examination Report under Sections 17 and 18(3) dated Jan. 13, 2022 for Application No. GB2110198.5; 8 pages.

* cited by examiner

*Primary Examiner* — John E Breene
*Assistant Examiner* — Alex T Devito

(57) ABSTRACT

A temperature control chamber includes a heat impact unit configured for heat impacting a sensor unit in accordance with a heat profile, the sensor unit configured for sensing heat impact response data over time in response to being heat impacted with the heat profile, and a determining unit configured for determining information indicative of a heat transfer characteristic in the temperature control chamber based on the sensed heat impact response data.

20 Claims, 2 Drawing Sheets

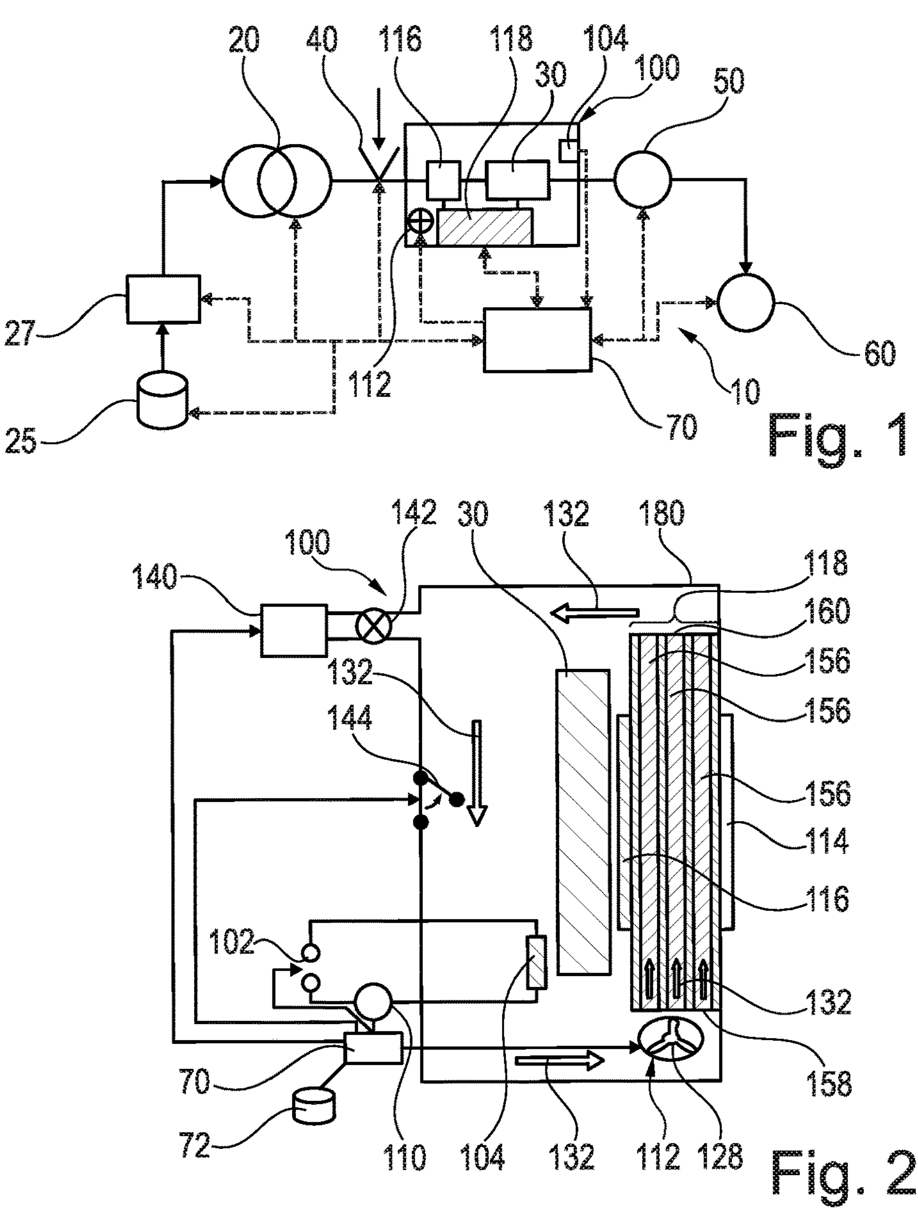
Fig. 1
Fig. 2
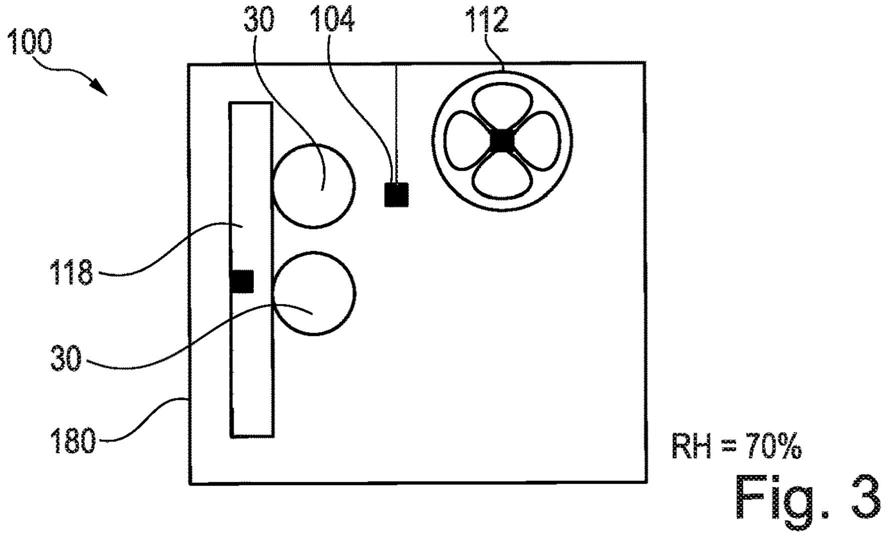
Fig. 3

MANAGING A HEAT TRANSFER CHARACTERISTIC IN A TEMPERATURE CONTROL CHAMBER

RELATED APPLICATIONS

This application claims priority to UK Application No. GB 2110198.5, filed Jul. 15, 2021, the entire contents of which are incorporated herein by reference.

TECHNICAL FIELD

The present invention relates to temperature control chambers, methods of operating a temperature control chamber, a sample separation apparatus, and a method of use.

BACKGROUND

In liquid chromatography, a fluid (such as a mixture between a fluidic sample and a mobile phase) may be pumped through conduits and a column comprising a material (stationary phase) which is capable of separating different components of the fluidic sample. Such a material, so-called beads which may comprise silica gel, may be filled into a column which may be connected to other elements (like a sampling unit, a flow cell, containers including sample and/or buffers) by conduits.

For operating a sample separation apparatus, the fluid can be preheated by a preheater assembly located downstream of an injector for injecting the fluidic sample in the mobile phase and upstream of the column.

During a separation process, it may be necessary or desirable to bring the column to a desired temperature. For this purpose, the column is mounted in a column oven and heated there. Conventionally, such heating may lack precision, which may have a negative impact on the accuracy of the separation result.

Also in other technologies, precise and efficient management of a temperature control chamber may still be an issue.

SUMMARY

It is an object of the invention to manage a temperature control chamber in a precise and efficient way.

According to an exemplary embodiment of a first aspect of the present invention, a temperature control chamber is provided which comprises a heat impact unit configured for heat impacting a sensor unit in accordance with a heat profile, the sensor unit configured for sensing heat impact response data over time in response to being heat impacted with the heat profile, and a determining unit configured for determining information indicative of a heat transfer characteristic in the temperature control chamber based on the sensed heat impact response data.

According to another exemplary embodiment of the first aspect of the present invention, a method of operating a temperature control chamber is provided, the method comprising heat impacting a sensor unit at the temperature control chamber in accordance with a heat profile, sensing heat impact response data over time by the sensor unit in response to being heat impacted with the heat profile, and determining information indicative of a heat transfer characteristic in the temperature control chamber based on the sensed heat impact response data.

According to an exemplary embodiment of a second aspect of the present invention, a temperature control chamber is provided which comprises a heat transfer impact unit controllable for impacting a heat transfer characteristic in the temperature control chamber, and a control unit configured for controlling the heat transfer impact unit to adjust the heat transfer characteristic in the temperature control chamber to comply with a target heat transfer characteristic.

According to another exemplary embodiment of the second aspect of the present invention, a method of operating a temperature control chamber is provided, the method comprising operating a heat transfer impact unit at the temperature control chamber for impacting a heat transfer characteristic in the temperature control chamber, and controlling the heat transfer impact unit to adjust the heat transfer characteristic in the temperature control chamber to comply with a target heat transfer characteristic.

According to another exemplary embodiment of the present invention (which may be applied in particular to the first aspect and/or the second aspect), a sample separation apparatus for separating a fluidic sample is provided, wherein the sample separation apparatus comprises a fluid drive unit configured for driving a mobile phase and the fluidic sample injected in the mobile phase, a sample separation unit configured for separating the fluidic sample in the mobile phase, and a temperature control chamber having the above mentioned features and accommodating the sample separation unit for controlling temperature of the sample separation unit.

According to still another exemplary embodiment (which may be applied in particular to the first aspect and/or the second aspect), a temperature control chamber having the above-mentioned features is used for at least one of a group consisting of a sample separation apparatus for separating a fluidic sample (in particular a chromatographic sample separation apparatus), a biochemical reactor (in particular a polymerase chain reaction device), and a dissolution apparatus.

In the context of this application, the term "temperature control chamber" may particularly denote a closed or closable room which may be delimited by an exterior casing and which may include functionality to control temperature (for instance of a sample separation unit mounted) inside the temperature control chamber. Optionally, an additional preheating assembly may be mounted inside the temperature control chamber. In particular, the temperature control chamber may comprise functionality to thermally couple a sample separation unit mounted in the temperature control chamber with a heat source or a heat sink. For example, the temperature control chamber may be a column oven when the sample separation unit is a chromatographic separation column. However, a temperature control chamber may also be used for other applications than sample separation, for instance for sample amplification and/or for simply dissolution.

In the context of this application, the term "heat impact unit" may particularly denote a source of thermal energy capable of providing thermal energy selectively to a sensor unit. For instance, a heat impact unit may supply an electric heating current to the sensor unit for heating the latter. It is however also possible that the heat impact unit provides directly thermal energy to the sensor unit, for instance by a heating coil (such as an ohmic heating coil) surrounding the sensor unit. Preferably, the heat impact unit is controllable to provide heat only to the sensor unit in a controlled way (in particular controlled in terms of timing and/or amount of providing heat).

In the context of this application, the term "heat profile" may particularly denote a heating energy over time characteristic (see for instance FIG. 6) according to which the heat impact unit is operated. For instance, a heat profile may be a short heat pulse heating the sensor unit substantially instantaneously. The heat profile may also be a sequence of temporally spaced heat pulses. Furthermore, the heat profile may be a continuous or modulated heating function over time. Also a sinusoidal heat profile is possible.

In the context of this application, the term "heat impact response data" may particularly denote sensor data being indicative of a time-dependent change of a sensed parameter after having applied heat in accordance with a heat profile to the sensor unit. More specifically, the heat impact response data may be data points of a decay function describing the decay of a signal of the sensor unit over time in response to an applied heat profile. For instance, a characteristic parameter of a sensor unit changing in response to the application of a heat profile to the sensor unit is the ohmic resistance, since the ohmic resistance of many materials (in particular metals such as platinum) sensitively depends on the temperature thereof. By applying a heat profile, the temperature of the sensor unit is increased, which will characteristically change the parameter to be sensed. The re-establishment of a thermal equilibrium between the heat-excited sensor unit and its non-heat-excited environment in a temperature control chamber after applying a heat profile to the sensor unit depends on the heat transfer characteristic within the temperature control chamber, so that analyzing the heat impact response data after a thermal excitation of the sensor unit may allow to derive information concerning the heat transfer characteristic.

In the context of this application, the term "heat transfer characteristic" may particularly denote a capability of the temperature control chamber or part thereof to transfer or exchange heat in its interior. In particular, the heat transfer characteristic may indicate a speed according to which a thermal equilibrium in an interior of the temperature control chamber is reached after disturbing the thermal equilibrium by applying the heat profile to the sensor unit. The heat transfer characteristic may indicate the capability of transferring heat in the interior of the temperature control chamber by at least one overall or averaged parameter characterizing the temperature control chamber as a whole in terms of heat transfer capability. However, the heat transfer characteristics may be alternatively a spatially dependent function indicating in a space-resolved and/or a time-resolved manner a heat transfer profile within the temperature control chamber or part thereof. For instance, such a space-resolved and/or time-resolved function may indicate regions and/or time intervals of pronounced and/or poor heat transfer capability. For instance, the heat transfer characteristic may indicate a Heat Transfer Coefficient (HTC). For example, a temperature control chamber (such as a column oven) may be characterized by two parameters, i.e. its adjustable temperature and the heat transfer characteristic describing how strong or weak an object in the column oven is thermally coupled with its environment in the temperature control chamber.

In the context of this application, the term "heat transfer impact unit" may particularly denote at least one device in and/or functionally coupled with the temperature control chamber and being configured for being operated to modify the heat transfer characteristic (for instance an HTC) inside the temperature control chamber or even at a specific position (for instance a chromatographic column mounting position) in the temperature control chamber. For example, the heat transfer impact unit may promote heat transfer inside of the temperature control chamber by generating fluid turbulence in the temperature control chamber or part thereof. Such fluid turbulence may be in particular turbulence of a gas (such as air) or a liquid (such as water) in the temperature control chamber. For instance, a heat transfer impact unit may be a fan inside the temperature control chamber.

In the context of this application, the term "control unit" may particularly denote a controlling entity (such as one or more processors or part of a processor) controlling operation of the heat transfer impact unit. The control unit may also control the temperature control chamber as a whole, or even a larger system (such as a sample separation apparatus) comprising such a temperature control chamber.

In the context of this application, the term "adjust a heat transfer characteristic to comply with a target heat transfer characteristic" may particularly denote that the control unit may send a control signal directly or indirectly to the heat transfer impact unit for triggering the heat transfer impact unit to change the heat transfer characteristic in the temperature control chamber in accordance with the control signal to comply with a predefined target heat transfer characteristic. The target heat transfer characteristic may for instance be a desired heat transfer characteristic, for instance as defined by a user, a machine, or a specification.

In the context of the present application, the term "sample separation apparatus" may particularly denote an apparatus which is configured for separating a fluidic sample, for instance into different fractions. In particular, the sample separation apparatus may be a chromatography apparatus. When the fluidic sample is supplied to the sample separation apparatus and is injected by an injector into a separation path between fluid drive unit and sample separation unit, different physical, chemical and/or biological properties of different fractions of the fluidic sample may result in a separation of different fractions in the sample separation unit.

In the context of the present application, the term "fluid" may particularly denote a liquid and/or a gas, optionally comprising solid particles.

In the context of this application, the term "fluidic sample" (or sample fluid) may particularly denote any liquid and/or gaseous medium, optionally including also solid particles, which is to be separated. Such a fluidic sample may comprise a plurality of different molecules or particles which shall be separated, for instance small mass molecules or large mass biomolecules such as proteins. Separation of a fluidic sample may involve a certain separation criterion (such as mass, volume, chemical properties, etc.) according to which a separation is carried out.

In the context of this application, the term "mobile phase" may particularly denote any liquid and/or gaseous medium which may serve as fluidic carrier of the fluidic sample during separation. A mobile phase may be a solvent or a solvent composition (for instance composed of water and an organic solvent such as ethanol or acetonitrile). In an isocratic separation mode of a liquid chromatography apparatus, the mobile phase may have a constant composition over time. In a gradient mode, however, the composition of the mobile phase may be changed over time, in particular to desorb fractions of the fluidic sample which have previously been adsorbed to a stationary phase of a sample separation unit.

In the context of the present application, the term "fluid drive unit" may particularly denote an entity capable of driving a fluid, in particular the fluidic sample and/or the mobile phase. For instance, the fluid drive may be a pump (for instance embodied as piston pump or peristaltic pump) or another source of pressure. For instance, the fluid drive unit may be a high-pressure pump, for example capable of driving a fluid with a pressure of at least 100 bar, in particular at least 1000 bar.

The term "sample separation unit" may particularly denote a fluidic member through which a fluidic sample is transferred, and which is configured so that, upon conducting the fluidic sample through the separation unit, the fluidic sample will be separated into different groups of molecules or particles. An example for a separation unit is a liquid chromatography column which is capable of trapping or retarding and selectively releasing different fractions of the fluidic sample. In particular, a sample separation unit may be a tubular body. For instance, a length of a sample separation unit may be in a range from 80 mm to 300 mm, for example 100 mm.

According to an exemplary embodiment of the first aspect of the invention, a specific amount of heat in accordance with a (in particular predefined) heat profile is applied only to a sensor unit arranged in a temperature control chamber for heating selectively the sensor unit in a well-defined way. Thereafter, a response of the sensor unit to this heat impact is sensed by the sensor unit as a function of time. This sensor response (for instance a decaying signal due to a recovery of a thermal equilibrium inside the temperature control chamber) to a defined heat profile can then be used for characterizing the heat transfer properties in the temperature control chamber. Thus, a very simple mechanism can be implemented in a temperature control chamber to evaluate its heat transfer properties. Advantageously, the substantially passive sensor-based determination of the heat transfer characteristic inside of the temperature control chamber may keep the thermal conditions inside of the temperature control chamber substantially unchanged despite heat impact applied to the sensor unit. The reason for this is that a sensor inside of the temperature control chamber may be a tiny body which can be characteristically heated with very small heat impact, allowing to determine the heat transfer characteristics in an accurate way while having no noteworthy impact on the thermodynamics in the temperature control chamber. For instance, the described heat excitation and sensor response analysis architecture may allow to characterize the heat transfer characteristics at or around a sample separation unit mounted in the temperature control chamber and having a sample separation characteristic depending in a sensitive way on the temperature control of the sample separation unit.

According to an exemplary embodiment of the second aspect of the invention, a temperature control chamber may be equipped with a heat transfer impact unit which is controlled for adapting a heat transfer characteristic in the temperature control chamber in accordance with a corresponding control signal. For instance in a scenario in which a poor thermal exchange inside the temperature control chamber or at a certain position therein is identified, this thermal exchange can be actively enhanced by operating the heat transfer impact unit accordingly (for instance by switching on or increasing a rotation speed of a fan in the temperature control chamber). In another scenario in which an excessively strong thermal exchange inside the temperature control chamber or at a certain position therein is identified, this thermal exchange can be actively attenuated by operating the heat transfer impact unit accordingly (for instance by switching off or decreasing a rotation speed of a fan in the temperature control chamber). Preferably, said adjustment of the heat transfer in the temperature control chamber can be carried out in a regulation loop, for instance based on sensor information (which may be obtained in accordance with an embodiment of the first aspect of the invention). For example, the described active heat transfer manipulation approach may allow to promote the heat transfer characteristics at or around a sample separation unit mounted in the temperature control chamber and having a sample separation characteristic depending in a sensitive way on the thermal conditions at the sample separation unit. If there is for instance evidence that the thermal exchange around such a sample separation unit in the temperature control chamber is insufficient, the heat transfer impact unit can be actively controlled for improving thermal exchange.

Exemplary embodiments relating to the first aspect may be implemented independently of the second aspect of the invention. Exemplary embodiments relating to the second aspect may be implemented independently of the first aspect of the invention. It is however particularly preferred to combine exemplary embodiments relating to the first aspect and the second aspect of the invention.

In the following, further embodiments of the temperature control chambers, the methods, and the sample separation apparatus will be explained.

In an embodiment, the determining unit may be configured for determining the information indicative of the heat transfer characteristic in the temperature control chamber based on the sensed heat impact response data in combination with the heat capacity of the sensor unit. In order to precisely calculate an absolute value of the Heat Transfer Coefficient (HTC), it may be advantageous to know the heat capacity of the sensor unit. For example, the heat capacity of the sensor unit can be derived from a heat up cycle. For instance, the system imposes a well-known energy (for example time multiplied by current and multiplied by voltage). This energy results in a temperature rise. Energy and/or temperature rise provide the heat capacity of the sensor unit. Hence, a self-calibrating sensor may be implemented.

In an embodiment, the heat profile comprises or consists of a heat pulse. Thus, the heat impact unit may be configured for impacting the sensor unit with a heat pulse. By applying a heat pulse (for example a current pulse) substantially instantaneously to the sensor unit (descriptively speaking almost as a Dirac pulse), a decay function following such an instantaneous thermal excitation of the sensor unit may have a particularly pronounced profile providing meaningful information about the heat transfer characteristic in the temperature control chamber.

In an embodiment, the heat impact unit is configured for impacting the sensor unit with the heat profile by conducting electric current through the sensor unit. Advantageously, it may be possible to apply an electric current to the sensor unit for heating the same. Applying a heating current signal to the sensor unit allows a particular simple control and also makes it possible to apply a heating pulse substantially simultaneously.

In an embodiment, the sensor unit comprises a temperature sensor. The time-dependent sensing of the temperature at the sensor unit over time following heat excitation can be used as a direct measure for the heat transfer characteristic in the temperature control chamber. For this reason, a temperature sensor is a preferred choice for the sensor unit. Temperature sensing may be done by sensing at least one temperature-dependent sensor parameter, such as the ohmic resistance, a wavelength of heat radiation emitted by the heated sensor unit, etc. However, the sensor unit may also be configured in another way than as a temperature sensor, as long as the sensor data provides information about the present heat transfer characteristic in the temperature control chamber. For instance, the sensor unit may be an air velocity sensor measuring an air velocity inside the temperature control chamber.

In an embodiment, the sensor unit comprises a resistance temperature sensor (or resistive temperature sensor or ohmic temperature sensor), which may for example function as resistance thermometer. More specifically, the development of the ohmic resistance of the sensor unit over time may be measured as an indicator for the actual heat transfer characteristics inside the temperature control chamber. For instance, the sensor unit may be a Pt100 sensor capable of sensing temperature based on the sensitive relation between ohmic resistance and temperature of platinum. Highly advantageously, a resistance temperature sensor such as a Pt100 sensor shows such a precise temperature dependence of its ohmic resistance that only a very minor heat energy impact of such a resistance temperature sensor is sufficient for accurately determining heat transfer properties without thermally influencing the temperature control chamber as a whole.

In other embodiments, other sensor units may be implemented. For instance, an air velocity sensor may be implemented. Also other kinds of temperature sensors may be implemented, for instance capacitive or optical temperature sensors.

In a preferred embodiment, the heat impact unit and the sensor unit are configured so that the heat profile heat impacts the sensor unit (preferably embodied as resistive sensor unit) and the heat impact response data is sensed via the same physical quantity (preferably electric current). Preferably, heat impacting the sensor unit and sensing by the sensor unit may be carried out using the same electrical terminals of the sensor unit. Highly advantageously, the sensor unit may be provided with electric terminals to which an electric current may be applied both for the purpose of impacting the sensor unit in accordance with a heat profile and for sensing sensor data being indicative of the heat transfer characteristic in the temperature control chamber. More specifically, an electric current supplied to the sensor unit may be used both for heating as well as for measuring a decay characteristic of the sensor unit following its heating. Taking this measure may render the sensor arrangement compact, simple in construction and control, and highly accurate. For example, the electric current according to the sensor-exciting heat profile may be significantly higher than the electric current used for sensing the time dependence following heat excitation.

In an embodiment, the heat impact response data comprises or consists of a recorded decay characteristic of a signal sensed by the sensor unit after being heated by the heat profile. For instance, it may be possible to record a decay characteristic as heat impact response data. A corresponding decay characteristic is shown for instance in FIG. 6. Such a decay characteristic describes the time dependence of a sensor signal corresponding to a measured parameter after application of the heat profile and shows a decay of the sensor signal due to the fact that, after heat excitation, the sensor unit will undergo a thermal equilibration with its thermodynamic environment in the temperature control chamber. The more pronounced the heat transfer between the heated sensor unit and its thermodynamic environment in the temperature control chamber is, the faster will be the decay, and vice versa. Thus, the slope of the decay can be used as a precise and easy indicator for the heat transfer performance in the temperature control chamber. For instance, an HTC value at a position of a sample separation unit in the temperature control chamber may be adjusted by correspondingly controlling a heat transfer impact unit such as a ventilator, wherein the recorded decay characteristic may be used as a basis for adjusting the control.

In an embodiment, the determining unit is configured for determining, as said information, a Heat Transfer Coefficient (HTC) in the temperature control chamber. For instance, the heat transfer characteristic may indicate an HTC value or a spatially-dependent and/or time-dependent HTC map or profile inside of the temperature control chamber. The Heat Transfer Coefficient may denote a thermodynamic proportionality constant between heat flux (i.e. thermal power per area) and the thermodynamic driving force for the flow of heat (i.e. a temperature difference) inside the temperature control chamber. The HTC can be the reciprocal of thermal insulance.

In an embodiment, the sensor unit is arranged in the temperature control chamber at a position with a heat transfer characteristic which resembles a heat transfer characteristic at another position in the temperature control chamber in which a sample separation unit is arranged or is to be arranged. For instance, the sensor unit may be located spatially remote from the sample separation unit, but at a position inside the temperature control chamber which has similar or identical heat transfer characteristics as at a position of the sample separation unit. For identifying an appropriate position for the sensor unit remote from the sample separation unit, a map or spatial profile of the heat transfer characteristics (for instance the value of the HTC) may be measured for the entire interior volume of the temperature control chamber, for instance by moving the sensor unit to multiple different positions in the interior volume of the temperature control chamber and by measuring the sensor data there. At a position in the temperature control chamber for which there is a best match with the heat transfer characteristics at the position of the sample separation unit, the sensor unit may be placed.

Alternatively, the sensor unit may be arranged directly next to the sample separation unit mounted in the temperature control chamber, or may be attached to the sample separation unit. This may allow to guarantee that the sensor data sensed by the sensor unit are precisely indicative of and meaningful for the heat transfer characteristic at the position of the sample separation unit.

In an embodiment, the sensor unit has a geometry which resembles a geometry of a sample separation unit to be arranged in the temperature control chamber. For instance, a sample separation unit embodied as chromatographic separation column has a substantially circular cylindrical geometry. It may then be advantageous to embody the sensor unit also with a substantially circular cylindrical geometry. For instance, resistance temperature sensors of such a shape are available. In view of the matching or corresponding form factors of sensor unit and sample separation unit, fluid dynamics around the sensor unit and the sample separation unit may be similar, and consequently very similar heat transfer characteristics may be reasonably expected.

In an embodiment, the determining unit is configured for converting determined information indicative of the heat transfer characteristic at a position of the sensor unit and/or relating to the geometry of the sensor unit to an information indicative of a heat transfer characteristic at another position of a sample separation unit and/or relating to another geometry of a sample separation unit arranged or to be arranged in the temperature control chamber. Hence, if the geometry (for instance a form factor, shape, proportions, etc.) between sensor unit and sample separation unit (such as a chromatographic separation column) is different, the impact of the different geometries may be modelled or calculated, so that information measured for the sensor unit can be converted, by calculation, into information relating to the geometrically different sample separation unit. Additionally or alternatively, when the sensor unit and the sample separation unit are located at different positions in the temperature control chamber at which the heat transfer characteristics are different, knowledge of a spatially-dependent map of the heat transfer characteristics inside the temperature control chamber (measured for instance by moving a sensor unit inside the temperature control chamber, as described above) may be used for converting, by calculation, information measured at the position of the sensor unit to information being indicative for the different position of the sample separation unit.

In an embodiment, the temperature control chamber comprises a heat transfer impact unit controllable for impacting the heat transfer characteristic in the temperature control chamber, and a control unit configured for controlling the heat transfer impact unit to adjust the heat transfer characteristic in the temperature control chamber based on the determined information indicative of the heat transfer characteristics in the temperature control chamber. Hence, information concerning the heat transfer characteristics in the temperature control chamber can be used for deriving a potential need to modify inadequate heat transfer characteristics or to adjust the heat transfer characteristic, for instance to (but not limited to) comply with a target heat transfer characteristic. For changing the heat transfer characteristic, a heat transfer impact unit may be used, for instance a fan in the temperature control chamber being operable for generating turbulence in the temperature control chamber for adjusting the heat transfer characteristic in accordance with an adjusted fan speed. If the determined information is indicative of an insufficient heat transfer in the temperature control chamber, the control unit may control the fan or the like to increase the amount of added turbulence, for instance by increasing its rotation speed. If however the determined information is indicative of an excessively high heat transfer in the temperature control chamber, the control unit may control the fan to reduce the amount of added turbulence, for instance by reducing its rotation speed.

In an embodiment, the control unit is configured for regulating the heat transfer characteristic in the temperature control chamber towards the target heat transfer characteristic based on sensor data being indicative of an actual heat transfer characteristic in the temperature control chamber. The control unit may compare an actual heat transfer characteristic, which may correspond to the real conditions in the temperature control chamber as sensed by a sensor unit in the temperature control chamber, with the target heat transfer characteristics. A discrepancy between the target heat transfer characteristics and the actual heat transfer characteristics may then be reduced, preferably to zero, by correspondingly modifying control of the heat transfer impact unit.

In an embodiment, the temperature control chamber comprises a sensor unit, in particular a temperature sensor unit, configured for sensing data being indicative of the actual heat transfer characteristic in the temperature control chamber. Said sensor unit may be embodied as the above-described sensor unit. Such a sensor unit may sense the real or actual heat transfer conditions inside the temperature control chamber for comparison with the target heat transfer conditions.

In an embodiment, the temperature control chamber comprises a heat impact unit configured for impacting a sensor unit in accordance with a heat profile, the sensor unit configured for sensing heat impact response data over time in response to being heat impacted with the heat profile, and a determining unit configured for determining information indicative of the actual heat transfer characteristic in the temperature control chamber based on the sensed heat impact response data. In order to obtain meaningful information for deriving the actual heat transfer characteristics in the temperature control chamber, the above-described concept of selectively heating the sensor unit and detecting its thermal recovery may be applied. The sensor-based knowledge of the actual heat transfer characteristics may then be used as a basis for regulating the heat transfer characteristics in the temperature control chamber, for at least partially compensating for a discrepancy between the sensor-detected actual heat transfer characteristic and a predefined target heat transfer characteristic.

In an embodiment, the target heat transfer characteristic comprises or consists of a target value of a Heat Transfer Coefficient (HTC) in the temperature control chamber. Hence, the control unit may be configured for controlling the heat transfer impact unit to adjust, as the target heat transfer characteristic, an HTC in the temperature control chamber. Thus, the control or regulation logic of the control unit may adjust the heat transfer characteristics by obtaining a desired value of the HTC in the temperature control chamber, in particular at a target position in the temperature control chamber (for instance a position at which a sample separation unit is mounted).

In an embodiment, the target heat transfer characteristic is a heat transfer characteristic of another temperature control chamber to be emulated. In such an embodiment, the target heat transfer characteristic may define a heat transfer characteristic of a reference temperature control chamber (for instance a reference temperature control chamber of a reference sample separation apparatus). When determining a discrepancy between the actual heat transfer characteristic of the present temperature control chamber (for instance measured by a sensor unit, as described above) and the target heat transfer characteristic of the other reference temperature control chamber, the control unit may control the heat transfer impact unit (for instance a fan) of the present temperature control chamber to modify the heat transfer characteristic of the present temperature control chamber so that the present temperature control chamber with its modified heat transfer characteristic behaves like the reference temperature control chamber. Thereby, operation of the present temperature control chamber may be modified for emulating or mimicking operation of the reference temperature control chamber. Advantageously, such an approach may make it for example possible that execution of a sample separation method (such as a chromatographic separation method) on different sample separation apparatuses (for instance different chromatographic separation apparatuses) with different temperature control chambers (such as different column heating ovens) behaving intrinsically differently may nevertheless lead to the same sample separation result (for instance the same chromatogram) due to the compensation of the differing heat transfer characteristics of the temperature control chambers.

In an embodiment, the target heat transfer characteristic is defined so that, when carrying out a sample separation method for separating a fluidic sample by a sample separation unit located in the temperature control chamber with the target heat transfer characteristic, a separation result resembles another separation result obtained when carrying out the sample separation method in the emulated other temperature control chamber. Consequently, separation results obtained on different sample separation apparatuses when executing the same sample separation method for separating a fluidic sample may be rendered directly comparable.

In an embodiment, the target heat transfer characteristic is a heat transfer characteristic of a calibration specification. In other words, modifying an actual heat transfer characteristic to adjust a target heat transfer characteristic may be carried out for calibrating different temperature control chambers for behaving correspondingly in terms of heat transfer characteristic. For example, it may be advantageous for a manufacturer of temperature control chambers that all temperature control chambers of a certain type behave in the same way. Consequently, for manufacturing temperature control chambers of the same heat transfer characteristic, an actual heat transfer characteristic may be measured for each individual temperature control chamber. During a calibration process, the heat transfer characteristic of all temperature control chambers may then be adjusted to comply with a common target heat transfer characteristic by individually modifying the temperature control characteristic of each temperature control chamber accordingly. This may be accomplished by individually controlling or setting the heat transfer impact unit of each temperature control chamber.

In an embodiment, the heat transfer impact unit comprises a ventilator for generating a fluid flow in the temperature control chamber. Such a ventilator may be placed inside of the temperature control chamber to displace air therein in accordance with a controllable ventilator speed. The faster the ventilator rotates, the stronger will the heat transfer characteristic be enhanced, and vice versa.

In an embodiment, the heat transfer impact unit comprises a pump for generating a fluid flow in the temperature control chamber. Such a pump may be arranged in the temperature control chamber or in fluid communication with the temperature control chamber. Such a pump may pump fluid (such as gas and/or liquid) in, into or through the temperature control chamber or part thereof in order to promote the heat transfer characteristic.

In an embodiment, the heat transfer impact unit comprises at least one flap being movable for redirecting a fluid flow in the temperature control chamber. Such flaps may for instance be formed in a casing of the temperature control chamber, and/or at different positions inside the temperature control chamber. With such flaps, a fluid flow (for instance an air turbulence or a liquid flow) may be specifically directed towards a target region in the temperature control chamber in which heat transfer shall be enhanced. For reducing heat transfer in a certain region in the temperature control chamber, a corresponding flap may be brought in an orientation which shields such a region from fluid turbulence.

In an embodiment, the heat impact unit and the sensor unit are configured so that impacting the sensor unit with the heat profile increases a temperature of the sensor unit by not more than 5K, in particular by not more than 2K. Highly advantageously, already a temperature increase of about 1K may be sufficient for instance for a resistor sensor unit (such as a Pt100) for precisely analyzing a decay after excitation of the sensor unit in accordance with a heat profile. This allows to precisely determine information characterizing the heat transfer properties inside of the temperature control chamber without the risk of manipulating the heat transfer characteristics or the temperature inside of the temperature control chamber to any noteworthy extent. Hence, due to the high sensitivity of temperature sensors and due to the fact that for instance ten measurement points may be sufficient for determining the decay characteristic of a temperature sensor after its thermal excitation by impacting it in accordance with a heat profile, a very small temperature increase of about 1K may be enough for determining the heat transfer characteristic.

In an embodiment, the temperature control chamber is configured as a column oven for accommodating a chromatographic separation column. In such a column oven, a chromatographic separation column may be mounted and may be brought to a controlled temperature during execution of a chromatographic sample separation method.

In an embodiment, the temperature control chamber comprises at least one sample separation unit mounting provision for mounting at least one sample separation unit. At least one sample separation unit may be mounted in an exchangeable way at the sample separation unit mounting provision in the temperature control chamber during execution of a chromatographic separation run.

In an embodiment, the temperature control chamber comprises a heating and/or cooling unit configured for heating and/or cooling a sample separation unit to be arranged in the temperature control chamber. For instance, a heating and/or cooling unit may be embodied as a Peltier element. It is also possible that a heating unit is embodied for example as ohmic heating unit.

In an embodiment, the temperature control chamber comprises a preheater assembly configured for preheating a fluidic sample and/or a mobile phase before reaching a sample separation unit for separating the fluidic sample in the mobile phase to be arranged in the temperature control chamber. The preheater assembly may be mounted as well inside of a column oven. By a capillary or the like, the preheater assembly may be in fluid communication with the sample separation unit located downstream thereof.

In an embodiment, the temperature control chamber comprises a heat exchanger for thermally coupling a heating and/or cooling unit with a sample separation unit. The heat exchanger may be made of a thermally highly conductive material for establishing a thermal connection between heating and/or cooling unit on the one hand and sample separation unit (and, if present, a preheater assembly) on the other hand.

The sample separation unit may be filled with a separating material. Such a separating material which may also be denoted as a stationary phase may be any material which allows an adjustable degree of interaction with a sample fluid so as to be capable of separating different components of such a sample fluid. The separating material may be a liquid chromatography column filling material or packing material comprising at least one of the group consisting of polystyrene, zeolite, polyvinylalcohol, polytetrafluorethylene, glass, polymeric powder, silicon dioxide, and silica gel, or any of above with chemically modified (coated, capped etc) surface. However, any packing material can be used which has material properties allowing an analyte passing through this material to be separated into different components, for instance due to different kinds of interactions or affinities between the packing material and fractions of the analyte.

At least a part of the sample separation unit may be filled with a fluid separating material, wherein the fluid separating material may comprise beads having a size in the range of essentially 1 μm to essentially 50 μm. Thus, these beads may be small particles which may be filled inside the separation section of the microfluidic device. The beads may have pores having a size in the range of essentially 0.01 μm to essentially 0.2 μm. The fluidic sample may be passed through the pores, wherein an interaction may occur between the fluidic sample and the pores.

The sample separation unit may be a chromatographic column for separating components of the fluidic sample. Therefore, exemplary embodiments may be particularly implemented in the context of a liquid chromatography apparatus.

The sample separation apparatus may be configured to conduct a liquid mobile phase through the sample separation unit. As an alternative to a liquid mobile phase, a gaseous mobile phase or a mobile phase including solid particles may be processed using the sample separation apparatus. Also materials being mixtures of different phases (solid, liquid, gaseous) may be processed using exemplary embodiments. The sample separation apparatus may be configured to conduct the mobile phase through the system with a high pressure, particularly of at least 600 bar, more particularly of at least 1200 bar.

The sample separation apparatus may be configured as a microfluidic device. The term "microfluidic device" may particularly denote a sample separation apparatus as described herein which allows to convey fluid through microchannels having a dimension in the order of magnitude of less than 500 μm, particularly less than 200 μm, more particularly less than 100 μm or less than 50 μm or less.

Exemplary embodiments of the sample separation apparatus may be implemented with a sample injector which may take up a sample fluid from a fluid container and may inject such a sample fluid in a conduit for supply to a separation column. During this procedure, the sample fluid may be compressed from, for instance, normal pressure to a higher pressure of, for instance several hundred bars or even 1000 bar and more. An autosampler may automatically inject a sample fluid from the vial into a sample loop. A tip or needle of the autosampler may dip into a fluid container, may suck fluid into the capillary and may then drive back into a seat to then, for instance via a switchable fluidic valve, inject the sample fluid towards a sample separation section of the liquid chromatography apparatus.

The sample separation apparatus may be configured to analyze at least one physical, chemical and/or biological parameter of at least one component of the sample fluid in the mobile phase. The term "physical parameter" may particularly denote a size or a temperature of the fluid. The term "chemical parameter" may particularly denote a concentration of a fraction of the analyte, an affinity parameter, or the like. The term "biological parameter" may particularly denote a concentration of a protein, a gene or the like in a biochemical solution, a biological activity of a component, etc.

The sample separation apparatus may be implemented in different technical environments, like a sensor device, a test device, a device for chemical, biological and/or pharmaceutical analysis, a capillary electrophoresis device, a liquid chromatography device, a gas chromatography device, an electronic measurement device, or a mass spectroscopy device. Particularly, the sample separation apparatus may be a High Performance Liquid Chromatography (HPLC) device by which different fractions of an analyte may be separated, examined and analyzed.

An embodiment of the present invention comprises a sample separation apparatus configured for separating compounds of a sample fluid in a mobile phase. The sample separation apparatus comprises a mobile phase drive, such as a pumping system, configured to drive the mobile phase through the sample separation apparatus. A sample separation unit, which can be a chromatographic column, is provided for separating compounds of the sample fluid in the mobile phase. The sample separation apparatus may further comprise a sample injector configured to introduce the sample fluid into the mobile phase, a detector configured to detect separated compounds of the sample fluid, a collector configured to collect separated compounds of the sample fluid, a data processing unit configured to process data received from the fluid separation system, and/or a degassing apparatus for degassing the mobile phase.

Embodiments may be implemented in conventionally available HPLC systems, such as the analytical Agilent 1290 Infinity II LC system or the Agilent 1290 Infinity II Preparative LC/MSD system (both provided by the applicant Agilent Technologies—see www.agilent.com).

One embodiment comprises a pumping apparatus having a piston for reciprocation in a pump working chamber to compress liquid in the pump working chamber to a high pressure at which compressibility of the liquid becomes noticeable. One embodiment comprises two pumping apparatuses coupled either in a serial or parallel manner.

The mobile phase (or eluent) can be either a pure solvent or a mixture of different solvents. It can be chosen for instance to minimize the retention of the compounds of interest and/or the amount of mobile phase to run the chromatography. The mobile phase can also be chosen so that the different compounds can be separated effectively. The mobile phase may comprise an organic solvent like for instance methanol or acetonitrile, often diluted with water. For gradient operation, water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The sample fluid or fluidic sample may comprise any type of process liquid, natural sample like juice, body fluids like plasma or it may be the result of a reaction like from a fermentation broth.

The fluid is preferably a liquid but may also be or comprise a gas and/or a supercritical fluid (as for instance used in supercritical fluid chromatography—SFC).

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

FIG. 1 shows a sample separation apparatus in accordance with embodiments of the present invention, particularly used in high performance liquid chromatography (HPLC).

FIG. 2 is a schematic illustration of a temperature control chamber for controlling temperature of a sample separation unit of a sample separation apparatus for separating a fluidic sample in a mobile phase by the sample separation unit according to an exemplary embodiment.

FIG. 3 is a schematic illustration of a temperature control chamber according to another embodiment.

Figure 4:
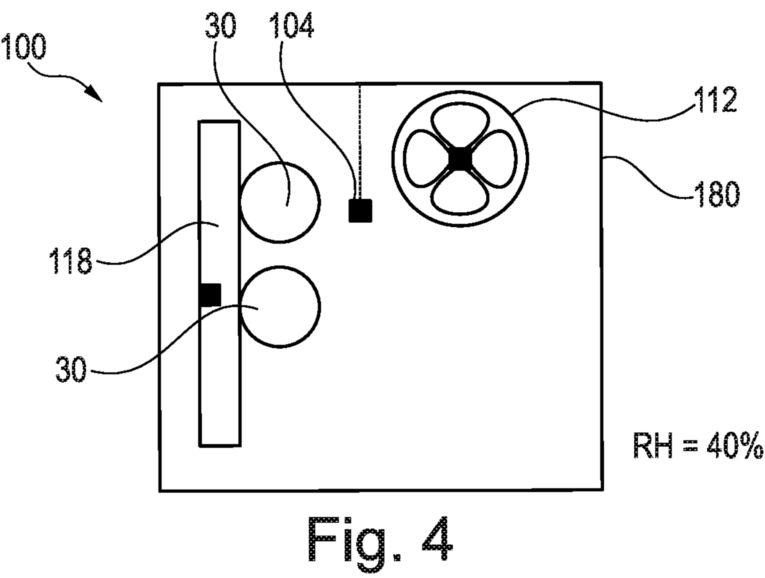
FIG. 4 is a schematic illustration of a temperature control chamber according to another embodiment.

The illustrations in the drawings are schematic.

DETAILED DESCRIPTION

Before referring to the figures, exemplary embodiments will be explained in further detail, some basic considerations will be explained based on which exemplary embodiments have been developed.

In a traditional approach, a temperature sensor may be mounted inside a column oven or on the chromatographic separation column itself for measuring a temperature. It may also be possible to arrange a flow sensor inside the column oven for measuring a flow rate. However, the chromatographic performance does not only depend on the temperature, but also on the efficiency of the heat transfer from the column to the oven, for instance if frictional heating is present. Thus, the thermal behavior of a temperature control chamber, such as a chromatographic column oven, may be taken into account insufficiently in conventional approaches.

According to an exemplary embodiment of a first aspect of the invention, a heat transfer characteristic in a temperature control chamber, such as a column oven for controlling temperature of a sample separation unit of a sample separation apparatus, is measured. This may be accomplished by applying a defined amount and pattern of heat in accordance with a heat profile to a sensor unit, and measuring the time dependence of a sensor signal—also denoted as heat impact response data—after said heat impact with the heat profile. Analyzing said sensor signal, i.e. evaluating a characteristic according to which the sensor unit restores a thermal equilibrium with its environment in the temperature control chamber after being heat impacted with the heat profile, can then provide information concerning a heat transfer characteristic in the temperature control chamber. Descriptively speaking, in particular a Heat Transfer Coefficient (HTC) may be measured as heat transfer characteristic in the temperature control chamber by carrying out a heat flux measurement. After having impacted the sensor unit with an amount of heat, the thermal decay behavior of the selectively heated sensor unit in its environment in the temperature control chamber may be measured for determining the HTC value. In a preferred embodiment, heating the sensor unit may be accomplished by applying an electric heating current to the sensor unit and measuring the decay behavior as a time dependence of an electric sensing current flowing through the sensor unit after its thermal excitation. Most preferably, this can be accomplished by configuring the sensor unit as resistance temperature sensor (for instance NTC (negative temperature coefficient), PTC (positive temperature coefficient) or Pt100 (i.e. standardized platinum) sensor).

According to an exemplary embodiment of a second aspect of the invention, a temperature control chamber may be controlled for adjusting a desired or target heat transfer characteristic thereof by correspondingly controlling a heat transfer impact unit (such as a ventilator) for impacting the heat transfer characteristic in the temperature control chamber. In particular, the temperature control chamber may be provided with an active element which can be controlled or regulated for varying a heat transfer characteristic in the temperature control chamber, in particular an HTC value thereof. Hence, the heat transfer characteristic in a temperature control chamber can be selectively varied by an active element which can be controlled or regulated so that a desired HTC value is obtained. Such an active element or heat transfer impact unit may for instance be a ventilator for venting air in the temperature control chamber to thereby enhance heat transfer in the temperature control chamber. Additionally or alternatively, a heat transfer impact unit may also comprise one or more flaps which can be selectively opened or closed in order to direct a heat convection flow towards a dedicated region in the temperature control chamber (for instance towards a chromatographic separation column mounted therein) or away from such a dedicated region. Further additionally or alternatively, a heat transfer impact unit may comprise a pump (such as an air pump or a pump in a liquid bath) for selectively enhancing heat exchange in a pumped region (for example of a dissolution tester) or element (for instance a chromatographic separation column) in the temperature control chamber. With the approach of actively controlling the heat transfer characteristic in a temperature control chamber by selectively enhancing or attenuating heat exchange in accordance with the operation of a heat transfer impact unit, it may for instance be possible to emulate, in a temperature control chamber such as a column oven, operation of another temperature control chamber such as another column oven. After characterization of heat transfer properties of a column oven, the characterization result may be used for emulation, i.e. for controlling the column oven in such a way that a temperature control behavior of another column oven is mimicked. For example, this may be accomplished to render a column oven compatible with a sample separation method executed using another column oven. Embodiments may also be used for calibration purposes, for instance for manufacturing temperature control chambers, such as column ovens, of the same characteristics. For example, each column oven may be subjected to a measurement of its actual heat transfer characteristics in a factory, followed by an individual manipulation of the individual heat transfer characteristics of each temperature control chamber so that, after calibration, all manufactured temperature control chambers show the same target heat transfer characteristic.

In embodiments, the first and the second aspect of the invention may also be combined with each other, for instance by firstly carrying out a determining method according to the first aspect and subsequently carrying out an adjusting method according to the second aspect based on a result of the determining method according to the first aspect. Although a column oven of a sample separation apparatus (for instance a liquid chromatography device, such as an HPLC (high-performance liquid chromatography), or a gas chromatography (GC) device) may be preferred embodiments for the temperature control chamber, other exemplary embodiments of the invention may be used for other applications (for instance a polymerase chain reaction (PCR) device for controlling temperature cycles in an oven, or a dissolution apparatus for characterizing thermal conditions in a liquid bath thereof).

As sensor unit, each sensor may be used providing a sensor signal allowing to determine the heat transfer characteristics, for instance for determining the HTC value, in the temperature control chamber. A single sensor unit may be used, or a plurality of sensor units being spatially distributed over an interior of the temperature control chamber. The heat transfer characteristics such as the HTC value, may be spatially dependent in the temperature control chamber. For the example of a chromatographic column oven as temperature control chamber, the sensor unit may be located at a column-equivalent position, for instance close to the chromatographic separation column rather than in a thermally weakly coupled corner in the column oven. It may also be advantageous to configure the sensor unit with a geometry (for instance with a cylindrical shape) which resembles the geometry of the sample separation unit (for instance a cylindrical shape of a chromatographic separation column). It may also be possible to select sensor position and/or sensor shape different from the sample separation unit, and calculating back from the determined heat transfer characteristic of the sensor unit to a different heat transfer characteristic of the sample separation unit. For this purpose, a heat transfer characteristic may firstly be measured in the temperature control chamber and may then be used as a basis for the calculation.

A first application example of an exemplary embodiment relates to a scenario in which a user has mounted only one single chromatographic separation column in a column oven-type temperature control chamber. Another user may however mount a plurality of sample separation units including a plurality of capillaries inside a column oven, which may inhibit air flow properties and may lead to a less efficient heat transfer characteristics compared to the application of the first mentioned user. A ventilator in the column oven of the second user may then be regulated for changing the HTC value in the second column oven so that the heat exchange behavior in both column ovens is the same, despite the different layouts with one or multiple separation columns in the column ovens.

A second application example of another exemplary embodiment relates to a scenario in which a chromatographic separation method has been developed under certain environmental conditions (for example in California), and shall now be executed under different environmental conditions (for instance in La Paz), for example under different pressure and/or temperature conditions of the environment. A column oven-type temperature control chamber may then be regulated for execution so that the behavior of the temperature control chamber equals (or is equivalent to) the behavior where the sample separation method has been developed.

An exemplary embodiment of the invention relates to the heat exchange between a liquid chromatography column and its surrounding environment within a temperature controlled column oven. A goal of an exemplary embodiment may be to maintain the heat exchange of the column independent of the type of column oven, the loading of the column oven, and/or air pressure and/or humidity, solely by controlling a fan speed within the column oven. In an embodiment, this may be accomplished by simulating or measuring the heat exchange characteristic of the column oven by an independent sensor unit located within the column oven. The fan speed may then be controlled to achieve a preset Heat Transfer Coefficient (HTC) of the sensor unit.

An exemplary embodiment of the invention relates to emulating the (in particular thermal) behavior of a certain column oven, for example for the purpose of method transfer. For instance, the exemplary embodiment may utilize the concept of measuring heat flux in the column oven chamber, for instance by heating a temperature sensor (for example by applying a large electric heating current), and determining the resulting course of temperature. This allows to determine the HTC. By providing a heat transfer impact unit, such as a fan, and operating the fan at different rotational speeds, the HTC value can be varied, for example to emulate an HTC value of a certain (for instance reference) column oven chamber.

In particular, it may be possible to emulate and/or calibrate a temperature control chamber such as a column oven. For such an application or for other applications, it may also be possible to determine the HTC value by applying a generic approach for using a single temperature sensor.

In a method of an exemplary embodiment, it may be possible to over-energize a sensor unit, to subsequently record a decay curve of a thermal behavior of the sensor unit (wherein the decay curve may be affected by its local environment, for example thermal capacity, air pressure, relative humidity, etc.), and to then determine the heat transfer characteristics such as an HTC value.

According to a preferred embodiment of the invention, a single sensor approach may be applied to control column oven performance by regulating a fan speed. In this context, a column oven performance in terms of heat transfer may be triggered and analyzed by a sensor.

According to an exemplary embodiment of the invention, it may be possible to measure the cooling behavior of a temperature sensor after being heat impacted by a heat pulse to determine the surrounding air velocity and the resulting heat transfer. In order to improve or even optimize the heat distribution in a chromatographic column inside a column oven, it may be advantageous to control the air flow rate inside the oven as the air velocity influences the HTC value. The HTC value may be dependent on air velocity, air pressure, temperature and/or humidity in the temperature control chamber. A sensor unit in a temperature control chamber according to an exemplary embodiment of the invention may take all those parameters into account.

Advantageously, exemplary embodiments of the invention allow a precise determination and/or control or regulation of the heat transfer characteristics in a temperature control chamber with low effort, due to very limited hardware requirements. Highly advantageously, exemplary embodiments may provide a high degree of accuracy, since it may be possible to directly measure a parameter of interest, rather than to only monitor air velocity (which may for example lead to deviations if atmospheric pressure or humidity varies).

Referring now in greater detail to the drawings, FIG. 1 depicts a general schematic of a liquid chromatography separation system as an example for a sample separation apparatus 10. A pump as an example for a fluid drive unit 20 receives a mobile phase from a solvent supply 25, typically via a degasser 27, which degases and thus reduces the amount of dissolved gases in the mobile phase. The fluid drive unit 20—such as a high-pressure pump—drives the mobile phase through a sample separation unit 30 (such as a chromatographic column) comprising a stationary phase. A sampling unit or injector 40 can be provided between the fluid drive unit 20 and the sample separation unit 30 in order to subject or add (often referred to as sample introduction) a sample fluid into the mobile phase. The stationary phase of the sample separation unit 30 is configured for separating compounds of the sample liquid. A detector 50 is provided for detecting separated compounds of the sample fluid. A fractionating unit 60 can be provided for outputting separated compounds of sample fluid.

While the mobile phase can be comprised of one solvent only, it may also be mixed from plural solvents. Such mixing may be a low pressure mixing and provided upstream of the fluid drive unit 20, so that the fluid drive unit 20 already receives and pumps the mixed solvents as the mobile phase. Alternatively, the fluid drive unit 20 may be comprised of plural individual pumping units, with plural of the pumping units each receiving and pumping a different solvent or mixture, so that the mixing of the mobile phase (as received by the sample separation unit 30) occurs at high pressure and downstream of the fluid drive unit 20 (or as part thereof). The composition (mixture) of the mobile phase may be kept constant over time, the so-called isocratic mode, or varied over time, the so-called gradient mode.

A control unit 70, which can be a conventional PC or workstation, may be coupled (as indicated by dashed arrows) to one or more of the devices in the sample separation apparatus 10 in order to receive information and/or control operation. For example, the control unit 70 may control operation of the fluid drive unit 20 (for instance setting control parameters) and receive therefrom information regarding the actual working conditions (such as output pressure, flow rate, etc., at an outlet of the pump). The control unit 70 may also control operation of the solvent supply 25 (for instance setting the solvent/s or solvent mixture to be supplied) and/or the degasser 27 (for instance setting control parameters such as vacuum level) and may receive therefrom information regarding the actual working conditions (such as solvent composition supplied over time, flow rate, vacuum level, etc.). The control unit 70 may further control operation of the sampling unit or injector 40 (for instance controlling sample injection or synchronization of sample injection with operating conditions of the fluid drive unit 20). The sample separation unit 30 may also be controlled by the control unit 70 (for instance selecting a specific flow path or column, setting operation temperature, etc.), and send—in return—information (for instance operating conditions) to the control unit 70. Accordingly, the detector 50 may be controlled by the control unit 70 (for instance with respect to spectral or wavelength settings, setting time constants, start/stop data acquisition), and send information (for instance about the detected sample compounds) to the control unit 70. The control unit 70 may also control operation of the fractionating unit 60 (for instance in conjunction with data received from the detector 50) and provide data back.

In FIG. 1 it can also be seen that the sample separation unit 30 (such as a chromatographic separation column) is arranged together with a preheater assembly 116 inside a temperature control chamber 100 (such as a column oven) and can be heated there using a heat source (not shown, compare reference sign 114 in FIG. 2). The preheater assembly 116 may be thermally coupled stronger and the sample separation unit 30 may be thermally coupled weaker to a heat exchanger 118 which is arranged as well within the temperature control chamber 100. Mobile phase and/or fluidic sample may flow, driven by the fluid drive unit 20, into the temperature control chamber 100 and inside of the temperature control chamber 100 firstly through the preheater assembly 116 for bringing the fluid to a target temperature and subsequently through the heated sample separation unit 30 for sample separation. In this way, the sample separation unit 30 can be brought to a target or predetermined temperature which may be desired for a sample separation process. The temperature control chamber 100 may be configured for controlling the temperature of the sample separation unit 30 of the sample separation apparatus 10 for separating a fluidic sample in a mobile phase by the sample separation unit 30.

Furthermore, FIG. 1 shows a sensor unit 104, such as a resistance temperature sensor, located close to the sample separation unit 30 in the temperature control chamber 100. The sensor unit 104 may provide sensor data to the control unit 70. Apart from this, a heat transfer impact unit 112, such as a ventilator, is arranged in the temperature control chamber 100 and can be controlled by the control unit 70 for adjusting heat transfer characteristics within the temperature control chamber 100.

Figure 6:
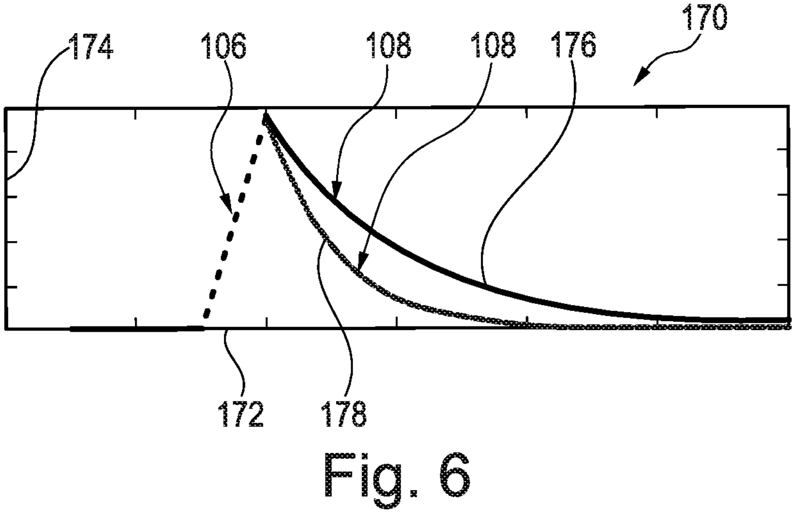
FIG. 6 shows a diagram illustrating operation of a temperature control chamber according to an exemplary embodiment.

For operating temperature control chamber 100, the sensor unit 104 may be heat impacted (i.e. selectively heated) in accordance with a heat profile, for instance by applying a heating current flowing through the sensor unit 104 (see reference sign 106 in FIG. 6). Thereafter, it may be possible to sense heat impact response data (compare reference sign 108 in FIG. 6) over time by the sensor unit 104 in response to being heat impacted with the heat profile 106. Descriptively speaking, cooling of the sensor unit 104 due to a thermal equilibration of the sensor unit 104—which has been previously heated by the heat profile—with its thermal environment in the temperature control chamber 100 may be sensed by sensing a current flowing through the sensor unit 104. In view of the temperature dependence of the ohmic resistance of the sensor unit 104, the present current flow will be an indicator for a present temperature of the sensor unit 104. Furthermore, the control unit 70 may determine information indicative of a heat transfer characteristic in the temperature control chamber 100 based on the sensed heat impact response data 108 (FIG. 6). The stronger the thermal coupling between the sensor unit 104 and its thermal environment in the temperature control chamber 100, the faster will be the thermal equilibration of the sensor unit 104 after being heat impacted by the heat profile, and vice versa.

The control unit 70 may then evaluate the determined heat transfer characteristic, for instance may determine an HTC value inside of temperature control chamber 100. Preferably, the control unit 70 may control heat transfer impact unit 112 to adjust a target heat transfer characteristic (for instance a target HTC value) in the temperature control chamber 100. In the present embodiment, the heat transfer impact unit 112 is embodied as a controllable ventilator, which can be controlled by the control unit 70. More specifically, the control unit 70 may operate the heat transfer impact unit 112 in the temperature control chamber 100 for impacting (for instance enhancing or attenuating) a heat transfer characteristic in the temperature control chamber 100. For instance, this impact of the heat transfer impact unit 112 may be so that a desired heat transfer characteristic is regulated inside of the temperature control chamber 100. If the determined actual heat transfer characteristic is too weak compared to a target heat transfer characteristic, the velocity of the ventilator may be increased. If the determined heat transfer characteristic is too strong, the velocity of the ventilator may be decreased.

FIG. 2 is a schematic illustration of a temperature control chamber 100 for controlling temperature of a sample separation unit 30 of a sample separation apparatus 10 (as the one shown in FIG. 1) for separating a fluidic sample in a mobile phase by the sample separation unit 30 according to an exemplary embodiment.

The embodiment of FIG. 2 provides a temperature control chamber 100, more specifically a column oven, for controlling temperature of a sample separation unit 30, such as a chromatographic separation column, of a sample separation apparatus 10, for instance a liquid chromatography device. Said temperature control chamber 100 may comprise a heat exchanger 118 for transferring heat to a flowing gas stream and is made of a thermally conductive material such as aluminum or copper. As shown, the heat exchanger 118 has (in the shown embodiment three) parallel gas channels 156 through which a gas, in particular air, is guidable simultaneously.

As shown, the gas channels 156 are open both on the bottom side and on the top side of the heat exchanger 118. More specifically, each of the gas channels 156 extends between an open bottom 158 and an open top 160 of the heat exchanger 118. The gas enters the gas channels 156 through the open bottom 158 and leaves the gas channels 156 through the open top 160. In the shown embodiment, the gas channels 156 extend in parallel to each other.

The illustrated temperature control chamber 100 is designed so that the gas is circulated in the temperature control chamber 100 to thereby control the temperature of the sample separation unit 30. As shown, the sample separation unit 30 is indirectly thermally coupled with the heat exchanger 118, preferably substantially without physical contact. More precisely, the sample separation unit 30 is thermally decoupled from the heat exchanger 118 concerning heat conduction, but is thermally coupled with the heat exchanger 118 in terms of heat convection and heat radiation.

In addition to the sample separation unit 30, also a preheater assembly 116 is mounted in the temperature control chamber 100 so as to be directly thermally coupled with direct physical contact with the heat exchanger 118. The preheater assembly 116 is configured for thermally pre-treating the fluidic sample and/or the mobile phase upstream of the sample separation unit 30. Preheater assembly 116 and sample separation unit 30 are fluidically coupled by a fluid conduit such as a capillary (not shown) so that fluid being preheated by the preheater assembly 116 may be supplied subsequently to the sample separation unit 30.

As shown, both the sample separation unit 30 and the preheater assembly 116, both being mounted on the heat exchanger 118, may be located in the central region of the temperature control chamber 100. An interior of the temperature control chamber 100 is delimited by an exterior surrounding casing 180. The heat exchanger 118 may be mounted at an inner wall of the casing 180. As shown, a closed circulation path 132 for the gas is formed.

As shown as well in FIG. 2, the temperature control chamber 100 comprises a ventilator 128 for ventilating gas to promote a gas flow in the interior of the temperature control chamber 100.

The temperature control chamber 100 may also comprise a heating and/or cooling unit 114 (such as a planar Peltier element) which is thermally coupled with the heat exchanger 118 for heating and/or cooling the heat exchanger 118.

Moreover, the temperature control chamber 100 comprises a mechanism of determining a heat transfer characteristic in the interior of the temperature control chamber 100 as well as a mechanism for actively adjusting the heat transfer characteristic in accordance with a result of the determining mechanism.

For this purpose, temperature control chamber 100 comprises a heat impact unit 102 configured for heat impacting a sensor unit 104 located inside of the temperature control chamber 100 in accordance with a heat profile (for instance in accordance with reference sign 106 shown in FIG. 6). In the shown embodiment, the heat impact unit 102 is an electric current source configured for providing a current pulse (as heat profile) to the sensor unit 104. The sensor unit 104 is embodied as a resistance temperature sensor, i.e. detecting a temperature by detecting a value of the ohmic resistance of the sensor unit 104 which sensitively depends on the temperature. However, before sensing, an excitation current is applied by the heat impact unit 102 to the sensor unit 104 for heating the latter to a temperature above the temperature in the temperature control chamber 100.

It is of utmost advantage that the heat impact unit 102 and the sensor unit 104 may be configured so that impacting the sensor unit 104 with the heat profile 106 increases a temperature of the sensor unit 104 by not more than 2K, for instance by not more than 1K. This may be made possible by configuring the sensor unit 104 as resistive temperature unit (for instance Pt100) which only requires a very small activation current for selectively and characteristically heating the sensor unit 104 and which allows a precise detection of the heat transfer characteristic, so that the thermodynamic properties of the rest of the temperature control chamber 100 are not influenced to any noteworthy degree by the sensing process.

Following this thermal excitation, a temperature equilibration between the sensor unit 104 and its surrounding in the temperature control chamber 100 will start, since the heated sensor unit 104 will start cooling. The speed of this thermal equilibration process depends on the degree of the thermal coupling inside the temperature control chamber 100, i.e. on the heat transfer characteristic inside the temperature control chamber 100. During said thermal equilibration process, the sensor unit 104 will sense heat impact response data (see reference sign 108 in FIG. 6) over time in response to being heat impacted with the heat profile 106. More specifically, a decay characteristic of a temperature-dependent signal (such as a current signal) at the sensor unit 104 may be recorded as heat impact response data 108. Since the temperature sensor unit 104 has a temperature dependent ohmic resistance, information indicative of its present temperature may be detected by applying a certain electric voltage to the temperature sensor unit 104 and by measuring the electric current flowing through the sensor unit 104. Due to the cooling or thermal equilibration process which the sensor unit 104 undergoes after being heat impacted with the heating pulse, the electric sensing current will change over time since also the ohmic resistance of the sensor unit 104 will change over time. Highly advantageously, the heat impact unit 102 (an electric current or voltage source in the shown embodiment) and the sensor unit 104 are configured so that the heat profile 106 heat impacts the sensor unit 104 and the heat impact response data 108 is sensed via the same physical quantity, in particular electric current.

A determining unit 110, such as a current measurement device (or a voltage measurement device), optionally in combination with signal processing resources, is configured for determining information indicative of a heat transfer characteristic in the temperature control chamber 100 based on the sensed heat impact response data 108. In other words, the determining unit 110 may detect a signal such as the one shown in FIG. 6 based on which the temperature development of the sensor unit 104 over time and therefore the heat transfer characteristic in the temperature control chamber 100 may be determined. For instance, the determined heat transfer characteristic may be or may comprise a Heat Transfer Coefficient (HTC) in the temperature control chamber 100. The determination result may be supplied to the control unit 70. It is also possible that the control unit 70 functions as determining unit 110.

Furthermore, the temperature control chamber 100 comprises a heat transfer impact unit 112, which is here embodied as ventilator 128 in an interior of the temperature control chamber 100. The heat transfer impact unit 112 is controllable by the control unit 70 for impacting, modifying or manipulating the heat transfer characteristic in the temperature control chamber 100. For instance, if the control unit 70 increases the rotation velocity of the ventilator 128, the heat transfer characteristic in the temperature control chamber 100 will be enhanced as compared to a scenario in which the control unit 70 decreases the rotation velocity of the ventilator 128.

Advantageously, the control unit 70 may be configured for controlling the heat transfer impact unit 112 to adjust a target heat transfer characteristic in the temperature control chamber 100. Descriptively speaking, the result of the determining by the determining unit 110 may be indicative of a real or actual heat transfer characteristic in the temperature control chamber 100. However, such a real or actual heat transfer characteristic may deviate from a target heat transfer characteristic which shall be ideally present in the temperature control chamber 100. For instance, such a target heat characteristic may be defined by a user operating the temperature control chamber 100 or the sample separation apparatus 10, may be defined by an emulation algorithm for emulating a function of another temperature control chamber by the temperature control chamber 100, may be defined by a calibration process for calibrating the temperature control chamber 100 to behave like a reference temperature control chamber, or may be defined in terms of a method transfer for transferring a sample separation method from one sample separation apparatus with temperature control chamber to another sample separation apparatus 10 with another temperature control chamber 100. Merely by adjusting operation of the ventilator 128—and/or any other appropriate heat transfer impact unit 112—the actual heat transfer characteristic may be regulated towards the target heat transfer characteristic. Advantageously, the control unit 70 may be configured for regulating the heat transfer characteristic in the temperature control chamber 100 towards the target heat transfer characteristic based on sensor data measured by sensor unit 104. Thus, the mechanism of adjusting the heat transfer characteristic may be a regulation mechanism with a sensor-based feedback loop.

In the shown embodiment, the temperature control chamber 100 is a column oven for controlling temperature of a chromatographic separation column, or another sample separation unit 30. Thus, the above described functionality may be carried out for determining the heat transfer characteristic at the position of the sample separation unit 30 in the temperature control chamber 100.

Furthermore, adjusting the heat transfer characteristic may be done for ensuring that the heat transfer characteristic at the position of the sample separation unit 30 equals or is very close to a corresponding target heat transfer characteristic. For this purpose, it may be advantageous that the sensor unit 104 is arranged in the temperature control chamber 100 at a position with a heat transfer characteristic which resembles a heat transfer characteristic at another position in the temperature control chamber 100 in which sample separation unit 30 is arranged or is to be arranged. Furthermore, particularly meaningful sensor results may be obtained when ensuring that the sensor unit 104 has a geometry which resembles a geometry of a sample separation unit 30 arranged or to be arranged in the temperature control chamber 100. In the shown embodiment, a column-shaped sensor unit 104 may have a shape corresponding to the column-shaped sample separation unit 30 and may be located spatially very close to the sample separation unit 30.

In a scenario in which the conditions mentioned in the previous paragraph cannot be met, the determining unit 110 may also be configured for converting determined information indicative of the heat transfer characteristic at a position of and/or relating to the geometry of the sensor unit 104 to an information indicative of a heat transfer characteristic at another position of and/or relating to another geometry of a sample separation unit 30 arranged or to be arranged in the temperature control chamber 100. For this purpose, the control unit 70 may use data sets stored for instance in a database 72. Such data sets may include a spatial map of a distribution of the heat transfer characteristic (for instance an HTC value) at different positions in an interior of the temperature control chamber 100, so that the knowledge of the heat transfer characteristic at one position (for instance a position of the sensor unit 104) allows a re-calculation of the heat transfer characteristic at another position (for instance a position of the sample separation unit 30). It is also possible that such a data set allows a re-calculation of the heat transfer characteristic depending on a shape of the sensor unit 104 as compared to a shape of the sample separation unit 30. Such reference data may be obtained by carrying out measurements with one or more sensor units 104 with different shapes and/or at different positions in the temperature control chamber 100 before operating the temperature control chamber 100 in the described way.

Additionally or alternatively to the ventilator 128, the heat transfer impact unit 112 may also comprise a gas pump 140 which may be brought in fluid communication with an interior of the temperature control chamber 100 by correspondingly operating a valve 142. When controlled by the control unit 70, the pump 140 may generate a gas (in particular air) flow in the temperature control chamber 100 for changing the heat transfer characteristics within the temperature control chamber 100 in a defined way. Additionally or alternatively to the ventilator 128 and/or the pump 140, the heat transfer impact unit 112 may comprise one or more flaps 144 (for instance, but not necessarily, arranged as part of the walls of casing 180) being movable for redirecting a fluid flow in the temperature control chamber 100. Descriptively speaking, the control unit 70 may control such at least one flap 144 to selectively influence the gas flow inside of the temperature control chamber 100, or to keep the gas flow as it is without impacting it actively.

FIG. 3 shows a temperature control chamber 100 according to an exemplary embodiment. According to FIG. 3, two sample separation units 30, configured as chromatographic separation columns, are mounted in the temperature control chamber 100, embodied as column oven. The relative humidity (RH) can be 70% in this embodiment.

FIG. 4 shows a temperature control chamber 100 according to another exemplary embodiment. According to FIG. 4, two sample separation units 30, configured as chromatographic separation columns, are mounted in the temperature control chamber 100, embodied as column oven. The relative humidity (RH) can be 40% in this embodiment.

Figure 5:
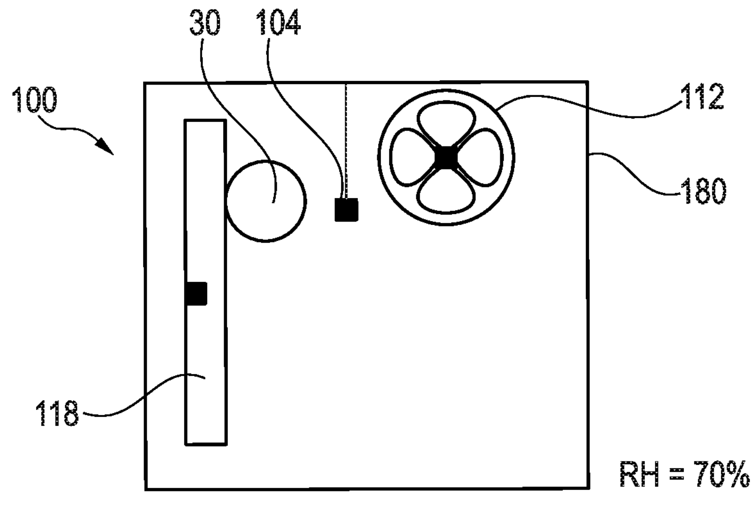
FIG. 5 is a schematic illustration of a temperature control chamber according to another embodiment.

FIG. 5 shows a temperature control chamber 100 according to still another exemplary embodiment. According to FIG. 5, one sample separation unit 30, configured as chromatographic separation column, is mounted in the temperature control chamber 100, embodied as column oven. The relative humidity (RH) can be 70% in this embodiment.

Hence, due to the different configurations according to FIG. 3 to FIG. 5 in terms of a number of mounted sample separation units 30 and/or relative humidity, the heat transfer characteristic in the interior of the respective temperature control chamber 100 may be different. Such differences may be compensated for by controlling the (here ventilator-type) heat transfer impact units 112 correspondingly, so that each temperature control chamber 100 according to FIG. 3 to FIG. 5 behaves identically despite the different configurations.

FIG. 6 shows a diagram 170 illustrating operation of a temperature control chamber 100 according to an exemplary embodiment.

The diagram 170 comprises an abscissa 172 along which the time is plotted. Along in ordinate 174, a course of an electric signal (such as electric current) flowing through a sensor unit 104 is plotted. A first curve 176, which can be detected by a determining unit 110, relates to a temperature control chamber 100 having a lower HTC value than another temperature control chamber 100 for which a second curve 178 is detected (which has a higher value of the HTC). A rapidly rising section of curves 176, 178 relates to a pulse-type heat profile 106 applied to the sensor unit 104 by applying for a very short time a high electric current to the sensor unit 104. A slower falling section of curves 176, 178 relates to a decay behavior of a sensed electric current flowing through sensor unit 104 following the excitation pulse corresponding to heat profile 106. After thermal excitation, the thereby increased temperature of the sensor unit 104 is reduced over time due to a thermal exchange between the sensor unit 104 and its environment in the temperature control chamber 100. Depending on the strength of this thermal exchange, and thus depending on the heat transfer characteristics in the temperature control chamber 100, the slope of curves 176, 178 in the range corresponding to the sensed heat impact response data 108 differs for the two compared cases. Curve 178 indicates a stronger thermal coupling, whereas curve 176 indicates a weaker thermal coupling.

Hence, FIG. 6 illustrates the temperature course over time at two different environmental conditions. In curve 178, the heat energy applied to the sensor unit 104 is dissipated faster than in the curve 176. This can be realized by higher air velocity, higher humidity and/or higher atmospheric pressure.

For example, a short energy pulse may be applied as heat profile 106 on the temperature sensor unit 104 (such as an NTC, a PTC, a Pt100, etc.), so that the resulting temperature increases. Then, the time course of the cooling behavior may be recorded by the temperature sensor unit 104. At high air velocities (see curve 178) the Heat Transfer Coefficient (HTC) is higher than with lower velocities (see curve 176) and the cooling of the sensor unit 104 will be faster. The fan speed can be adjusted to achieve the desired results.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. A temperature control chamber, comprising:

a casing delimiting an interior and configured to enclose therein a sample separation unit to be temperature-controlled;

a sensor unit disposed in the interior separate from and outside the sample separation unit;

a heat impact unit configured to heat impact the sensor unit in accordance with a heat profile, wherein the sensor unit is configured to sense heat impact response data over time in response to being heat impacted in accordance with the heat profile; and a determining unit configured to determine information indicative of a heat transfer characteristic in the interior based on the sensed heat impact response data.

2. The temperature control chamber according to claim 1, wherein the heat profile comprises a heat pulse.

3. The temperature control chamber according to claim 1, wherein the heat impact unit is configured to heat impact the sensor unit with the heat profile by conducting electric current through the sensor unit.

4. The temperature control chamber according to claim 1, comprising at least one of the following features:

wherein the sensor unit comprises a temperature sensor;

wherein the sensor unit comprises a resistance temperature sensor;

wherein the heat impact unit and the sensor unit are configured so that the heat profile heat impacts the sensor unit and the heat impact response data is sensed via the same physical quantity;

wherein the heat impact unit and the sensor unit are configured so that the heat profile heat impacts the sensor unit and the heat impact response data is sensed via the same physical quantity, and the physical quantity is electric current and/or electric voltage;

wherein the heat impact unit and the sensor unit are configured so that heat impacting the sensor unit with the heat profile increases a temperature of the sensor unit by a value selected from the group consisting of: not more than 5K; and not more than 2K.

5. The temperature control chamber according to claim 1, wherein the heat impact response data comprises a recorded decay characteristic of a signal sensed by the sensor unit after being heated by the heat profile.

6. The temperature control chamber according to claim 1, wherein the heat transfer characteristic comprises a value of a Heat Transfer Coefficient in the temperature control chamber.

7. The temperature control chamber according to claim 1, comprising at least one of the following features:

wherein the sensor unit is arranged in the interior at a position with a heat transfer characteristic that resembles a heat transfer characteristic at another position in the interior at which the sample separation unit is arranged or is to be arranged;

wherein the sensor unit has a geometry that resembles a geometry of the sample separation unit arranged or to be arranged in the interior;

wherein the determining unit is configured to convert determined information indicative of the heat transfer characteristic at a position of and/or relating to the geometry of the sensor unit to an information indicative of a heat transfer characteristic at another position of and/or relating to another geometry of the sample separation unit arranged or to be arranged in the interior.

8. The temperature control chamber according to claim 1, comprising:

a heat transfer impact unit configured to impact the heat transfer characteristic in the interior; and a control unit configured to control the heat transfer impact unit to adjust the heat transfer characteristic in the interior based on the determined information.

9. The temperature control chamber according to claim 1, comprising at least one of the following features:

the temperature control chamber is configured as a column oven for accommodating the sample separation unit as a chromatographic separation column;

at least one sample separation unit mounting provision configured to mount at least one sample separation unit in the interior;

a heating and/or cooling unit configured to heat and/or cool the sample separation unit arranged or to be arranged in the interior;

a preheater assembly configured for preheating a fluidic sample and/or a mobile phase before reaching the sample separation unit for separating the fluidic sample in the mobile phase arranged or to be arranged in the interior;

a heat exchanger for thermally coupling a heating and/or cooling unit with the sample separation unit.

10. A sample separation apparatus for separating a fluidic sample, the sample separation apparatus comprising:

a fluid drive unit configured for driving a mobile phase and the fluidic sample injected in the mobile phase; and the temperature control chamber according to claim 1 accommodating the sample separation unit for controlling temperature of the sample separation unit, the sample separation unit being configured to separate the fluidic sample in the mobile phase.

11. The temperature control chamber according to claim 1, comprising the sample separation unit, wherein the sample separation unit is selected from the group consisting of: a chromatographic column; an electrophoretic capillary; a biochemical reactor; a sample amplification device; a polymerase chain reaction device; and a dissolution apparatus.

12. A temperature control chamber, comprising:

a casing delimiting an interior and configured to enclose therein a sample separation unit to be temperature-controlled;

a sensor unit disposed in the interior separate from and outside the sample separation unit and configured to sense sensor data indicative of a heat transfer characteristic in the interior;

a heat transfer impact unit configured to impact the heat transfer characteristic in the interior; and a control unit configured to control the heat transfer impact unit to adjust the heat transfer characteristic in the interior to comply with a target heat transfer characteristic, based on the sensor data.

13. The temperature control chamber according to claim 12, comprising:

a heat impact unit configured to heat impact the sensor unit in accordance with a heat profile, wherein the sensor unit is configured to sense heat impact response data over time in response to being heat impacted in accordance with the heat profile; and a determining unit configured to determine information indicative of the heat transfer characteristic in the interior based on the sensed heat impact response data, wherein the control unit is configured to control the heat transfer impact unit to adjust the heat transfer characteristic in the interior based on the determined information.

14. The temperature control chamber according to claim 12, wherein the target heat transfer characteristic is a heat transfer characteristic of another temperature control chamber to be emulated, and wherein the target heat transfer characteristic is defined so that, when carrying out a sample separation method for separating a fluidic sample by the sample separation unit located in the temperature control chamber with the target heat transfer characteristic, a separation result resembles another separation result obtained when carrying out the sample separation method in the emulated other temperature control chamber.

15. The temperature control chamber according to claim 12, wherein the heat transfer impact unit comprises at least one of:

a ventilator for generating a fluid flow in the interior;

a pump for generating a fluid flow in the interior;

at least one flap being movable for redirecting a fluid flow in the interior.

16. The temperature control chamber according to claim 12, wherein the target heat transfer characteristic comprises a target value of a Heat Transfer Coefficient in the temperature control chamber.

17. A temperature control chamber, comprising:

a casing delimiting an interior and configured to enclose therein a sample separation unit to be temperature-controlled;

a sensor unit disposed in the interior;

a heat impact unit configured to heat impact the sensor unit in accordance with a heat profile, wherein the sensor unit is configured to sense heat impact response data over time in response to being heat impacted in accordance with the heat profile;

a determining unit configured to determine information indicative of a heat transfer characteristic in the interior based on the sensed heat impact response data;

a heat transfer impact unit configured to impact the heat transfer characteristic in the interior; and a control unit configured to control the heat transfer impact unit to adjust the heat transfer characteristic in the interior based on the determined information.

18. The temperature control chamber according to claim 17, wherein the heat transfer characteristic comprises a value of a Heat Transfer Coefficient in the temperature control chamber.

19. A temperature control chamber, comprising:

a casing delimiting an interior and configured to enclose therein a sample separation unit to be temperature-controlled;

a sensor unit disposed in the interior and configured to sense sensor data indicative of a heat transfer characteristic in the interior;

a heat transfer impact unit configured to impact the heat transfer characteristic in the interior; and a control unit configured to control the heat transfer impact unit to adjust the heat transfer characteristic in the interior to comply with a target heat transfer characteristic, based on the sensor data, wherein the target heat transfer characteristic comprises a target value of a Heat Transfer Coefficient in the temperature control chamber.

20. The temperature control chamber according to claim 19, comprising:

a heat impact unit configured to heat impact the sensor unit in accordance with a heat profile, wherein the sensor unit is configured to sense heat impact response data over time in response to being heat impacted in accordance with the heat profile; and a determining unit configured to determine information indicative of a heat transfer characteristic in the interior based on the sensed heat impact response data.

* * * * *